United States Patent
Sevindik (10) Patent No.: US 9,894,677 B1
(45) Date of Patent: Feb. 13, 2018

(54) SYSTEMS AND METHODS FOR CONFIGURING A SCHEDULER AT AN ACCESS NODE

(71) Applicant: Sprint Spectrum LP, Overland Park, KS (US)

(72) Inventor: Volkan Sevindik, Fairfax, VA (US)

(73) Assignee: SPRINT SPECTRUM L.P., Overland Park, KS (US)

( * ) Notice: Subject to any disclaimer, the term of this patent is extended or adjusted under 35 U.S.C. 154(b) by 0 days.

(21) Appl. No.: 14/628,553

(22) Filed: Feb. 23, 2015

(51) Int. Cl.
*H04W 72/00* (2009.01)
*H04W 72/12* (2009.01)
*H04W 72/04* (2009.01)

(52) U.S. Cl.
CPC ..... *H04W 72/1252* (2013.01); *H04W 72/048* (2013.01); *H04W 72/1231* (2013.01); *H04W 72/1242* (2013.01)

(58) Field of Classification Search
CPC .................................................. H04W 16/12
USPC .................................................. 455/452.11
See application file for complete search history.

(56) References Cited

U.S. PATENT DOCUMENTS

| | | | | |
|---|---|---|---|---|
| 2001/0034236 A1* | 10/2001 | Tong | ..................... | H04W 16/28 455/450 |
| 2004/0165598 A1* | 8/2004 | Shrimali | ............... | H04L 49/254 370/395.42 |
| 2006/0019701 A1* | 1/2006 | Ji | ......................... | H04W 16/04 455/553.1 |
| 2006/0223520 A1* | 10/2006 | Laroia | .................... | H04B 7/022 455/422.1 |
| 2007/0087772 A1* | 4/2007 | Yi | ....................... | H04W 52/346 455/522 |
| 2008/0188232 A1* | 8/2008 | Park | .................. | H04W 72/1231 455/450 |
| 2011/0158203 A1* | 6/2011 | Biton | ................ | H04W 72/1257 370/336 |
| 2011/0269442 A1* | 11/2011 | Han | .................... | H04W 72/082 455/418 |

* cited by examiner

*Primary Examiner* — Fabricio R Murrillo Garcia (57) ABSTRACT

Systems and methods are described for configuring a scheduler at an access node. At least two regions may be determined for a coverage area of an access node, wherein a first region is bounded by a first distance from the access node and a second region is bounded by a second distance from the access node such that the second distance is greater than the first distance. Wireless transmissions may be scheduled from the access node based on a fairness algorithm such that the fairness algorithm schedules wireless transmissions to wireless devices associated with the first region based on throughput for the wireless devices associated with the first region and the fairness algorithm schedules wireless transmissions to wireless devices associated with the second region based on throughput for wireless devices associated with the second region.

14 Claims, 7 Drawing Sheets

SYSTEMS AND METHODS FOR CONFIGURING A SCHEDULER AT AN ACCESS NODE

TECHNICAL BACKGROUND

Telecommunication systems, such as cellular networks or other wireless networks, use various network links throughout the network to communicate. For example, an access node may use a network link to communicate with another access node while using a separate network link to communicate with another processing node. Accordingly, the system may rely on a well-established network to provide efficient communication services.

In certain circumstances, a portion of the network may experience high load (e.g., load above a threshold) or poor channel conditions. For example, a communication link may experience large amount of data traffic or poor channel conditions may render a communication link less effective, and the efficiency of the system may suffer. Accordingly, a system that effectively balances load and considers channel conditions may be able to provide a high quality service to users of the system.

OVERVIEW

Systems and methods are described for configuring a scheduler at an access node. At least two regions may be determined for a coverage area of an access node, wherein a first region is bounded by a first distance from the access node and a second region is bounded by a second distance from the access node such that the second distance is greater than the first distance. Wireless transmissions may be scheduled from the access node based on a fairness algorithm such that the fairness algorithm schedules wireless transmissions to wireless devices associated with the first region based on throughput for the wireless devices associated with the first region and the fairness algorithm schedules wireless transmissions to wireless devices associated with the second region based on throughput for wireless devices associated with the second region.

DETAILED DESCRIPTION

Figure 1:
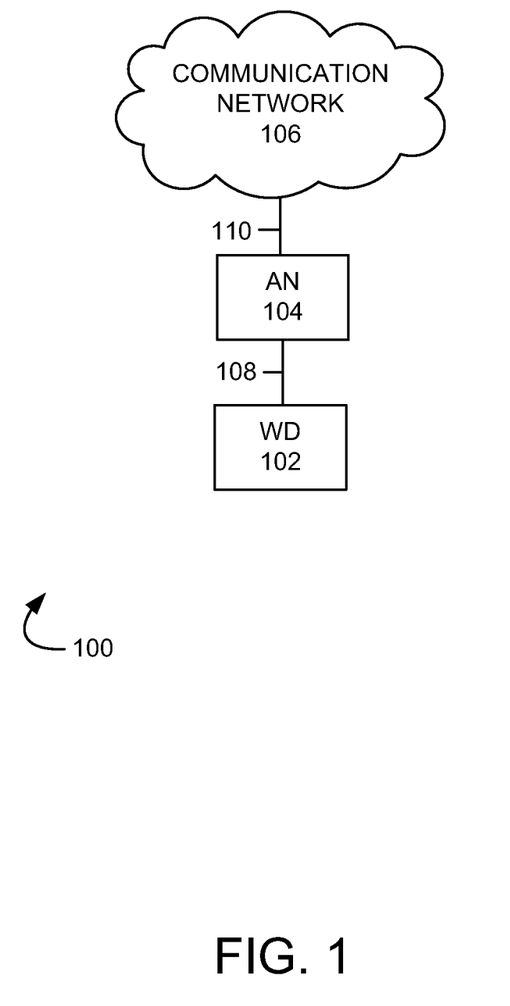
FIG. 1 illustrates an exemplary communication system to configure a scheduler at an access node.

FIG. 1 illustrates an exemplary communication system 100 to configure a scheduler at an access node comprising wireless device 102, access node 104, communication network 106, and communication links 108 and 110. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access node 104 and communication network 106 which are omitted for clarity, including additional processing nodes, routers, gateways, and physical and/or wireless data links for carrying data among the various network elements.

Wireless device 102 can be any device configured to communicate over communication system 100 using a wireless communication link. For example, wireless device 102 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with access node 104, any number of wireless devices can be implemented.

Access node 104 is a network node capable of providing wireless communications to wireless device 102, and can be, for example, a base transceiver station, a radio base station, and an eNodeB device. Access node 104 may communicate with communication network 106 over communication link 110. Although only access node 104 is illustrated in FIG. 1, wireless device 102 (and other wireless devices not depicted) can be in communication with a plurality of access nodes and/or small cells. The plurality of access nodes and/or small cells can be associated with different networks and can support different communication protocols and radio access technologies.

Communication network 106 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 106 can be capable of carrying voice information and other information, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 106 may also comprise a wireless network, including base stations, wireless communication nodes, telephony switches, internet routers, network gateways, computer systems, communication links, or some other type of communication equipment, and combinations thereof.

Communication links 108 and 110 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

Figure 2:
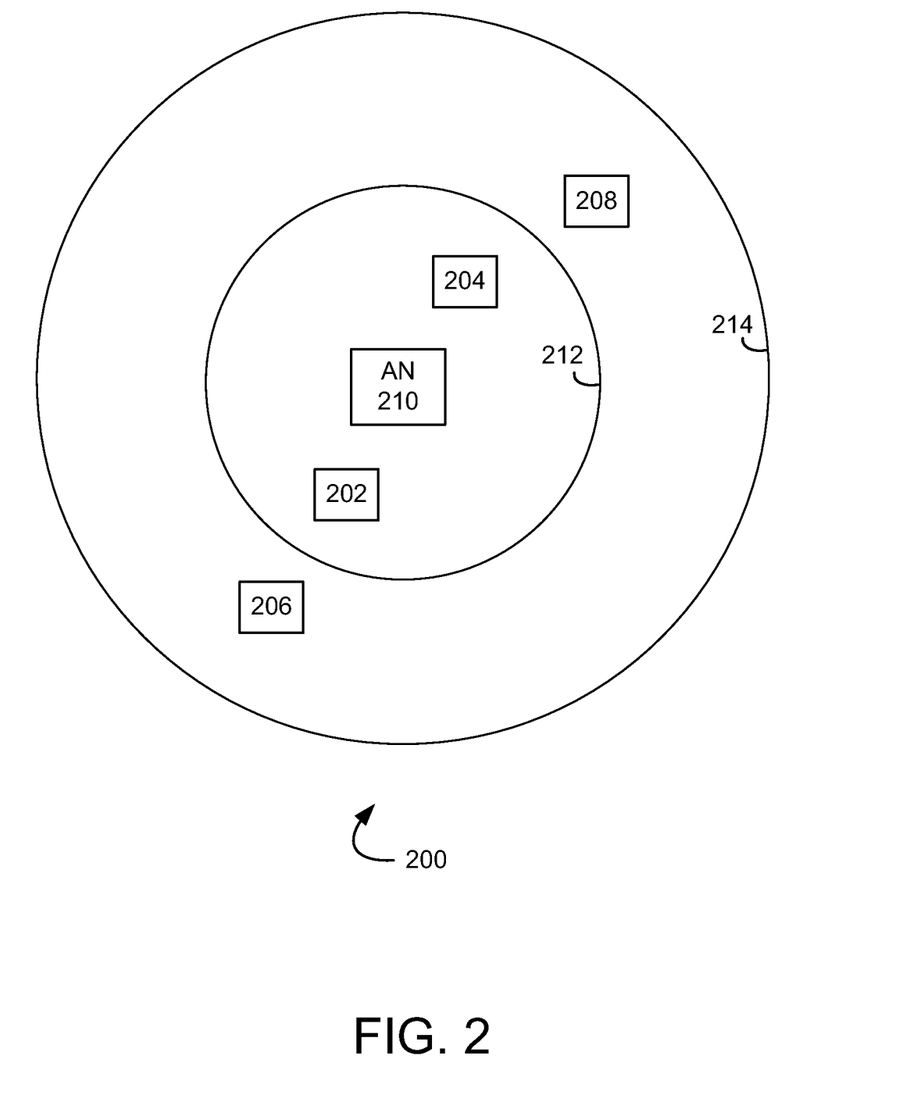
FIG. 2 illustrates another exemplary communication system to configure a scheduler at an access node.

FIG. 2 illustrates an exemplary communication system 200 for configuring a scheduler at an access node. System 200 comprises wireless devices 202, 204, 206, and 208, access node 210, and coverage regions 212 and 214. Wireless devices 202, 204, 206, and 208 may comprise wireless devices similar to wireless device 102 and access node 210 may comprise an access node similar to access node 104.

In an embodiment, system 200 may use a plurality of carriers in order to provide wireless communication services. A plurality of carriers that comprise bandwidth for wireless communications (e.g., 2.5 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers.

In an embodiment, a signal area may comprise an area around an access node where a wireless device may detect wireless signals transmitted from the access node (e.g., a references signal) at a signal level above a threshold. In this example, access node 210 may comprise a signal area that is partitioned into coverage regions 212 and 214. For example, coverage region 212 may comprise the region between access node 210 and a first distance, illustrated by the inner concentric circle, and coverage region 214 may comprise the region between region 212 and a second distance, illustrated by the outer concentric circle. Access node 210 may transmit wireless signals over one or more particular band classes (BCs). A band class may comprise a block of wireless spectrum. In an embodiment, a frequency band may comprise a band class. Examples of such band classes may be blocks of spectrum at 800 MHz, 1,900 MHz, and 2,500 MHz In operation, access node 210 may establish communication with wireless devices 202, 204, 206, and 208 such that access node 210 provides the wireless devices access to a communication network (e.g., communication network 106). Access node 210 may schedule transmissions (e.g., physical resource block transmissions) to wireless devices in communication with the access node. For example, a packet may be received at access node 210 that is associated with wireless device 202, and access node 210 may schedule one or more transmissions to wireless device 202 to communicate the data from the received packet.

In an embodiment, access node 210 may schedule transmissions according to a fairness algorithm. For example, for each wireless device in communication with an access node, a scheduler may calculate k such that k=arg max $r_i(t)/R_i(t)$. Here, $R_i(t)$ may comprise an average data rate for wireless device i over a time window, and $r_i(t)$ may comprise an instantaneous data rate (e.g., average instantaneous data rate) for wireless device i. A fairness algorithm may then schedule a transmission for the wireless device that comprises the greatest k value.

In some embodiments, fairness algorithms may limit throughput for an access node. For example, wireless devices 202 and 204 may be closer in proximity to the access node 210, and therefore may comprise a greater channel quality (e.g., CQI) than wireless devices 208 and 206. As such, when communicating with access node 210, wireless devices 202 and 204 may be able to achieve a higher throughput (e.g., use a more efficient modulation and coding scheme) than wireless devices 206 and 208. Accordingly, when scheduling wireless resources (e.g., physical resource block transmissions), fairness to wireless devices 206 and 208 may limit throughput. A system that balances fairness and throughput may be able to provide efficient wireless communications.

Systems and methods are described for configuring a scheduler at an access node. At least two regions may be determined for a coverage area of an access node, wherein a first region is bounded by a first distance from the access node and a second region is bounded by a second distance from the access node such that the second distance is greater than the first distance. Wireless transmissions may be scheduled from the access node based on a fairness algorithm such that the fairness algorithm schedules wireless transmissions to wireless devices associated with the first region based on throughput for the wireless devices associated with the first region and the fairness algorithm schedules wireless transmissions to wireless devices associated with the second region based on throughput for wireless devices associated with the second region.

Figure 3:
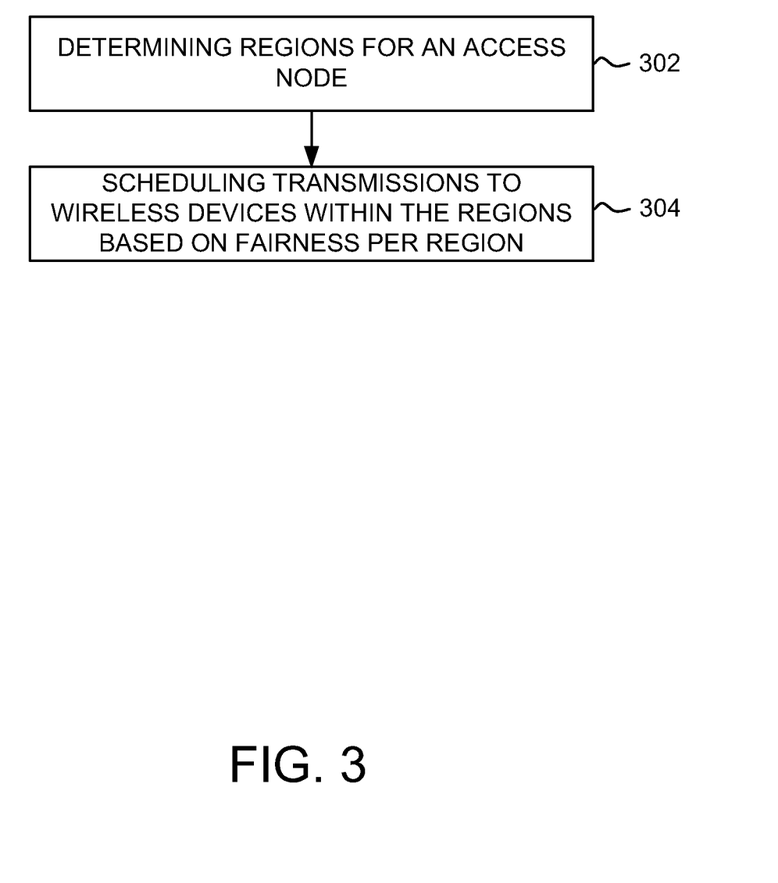
FIG. 3 illustrates an exemplary method for configuring a scheduler at an access node.

FIG. 3 illustrates an exemplary method for configuring a scheduler at an access node. The method will be discussed with reference to the exemplary communication system 200 illustrated in FIG. 2, however, the method can be implemented with any suitable communication system.

Referring to FIG. 3, at step 302, at least two regions may be determined for a coverage area of an access node, wherein a first region is bounded by a first distance from the access node and a second region is bounded by a second distance from the access node such that the second distance is greater than the first distance. For example, coverage regions 212 and 214 may be determined for the coverage area of access node 210. Coverage region 212 may comprise the region between access node 210 and a first distance, illustrated by the inner concentric circle, and coverage region 214 may comprise the region between region 212 and a second distance, illustrated by the outer concentric circle.

At step 304, wireless transmissions may be scheduled from the access node based on a fairness algorithm such that the fairness algorithm schedules wireless transmissions to wireless devices associated with the first region based on throughput fairness for the wireless devices associated with the first region and the fairness algorithm schedules wireless transmissions to wireless devices associated with the second region based on throughput fairness for wireless devices associated with the second region. For example, wireless transmissions may be scheduled from access node 210 to wireless devices 202, 204, 206, and 208. The wireless transmission may be scheduled based on a coverage region associated with the wireless devices. For example, wireless devices 202 and 204 may be associated with coverage region 212 and wireless devices 206 and 208 may be associated with coverage region 214.

In an embodiment, a scheduling metric may be calculated for each of wireless devices 202, 204, 206 and 208. The scheduling metric for each wireless device may be calculated based on the throughput for the particular wireless device. Access node 210 may schedule transmissions for region 212 based on the calculated scheduling metrics for wireless devices 202 and 204, and may schedule transmissions for region 214 based on the calculated scheduling metrics for wireless devices 206 and 208. In an embodiment, access node 210 may schedule a transmission for region 212 to the wireless device associated with that region that comprises the greatest calculated metric (e.g., one of wireless devices 202 and 204), and may schedule a transmission for region 214 to the wireless device associated with that region that comprises the greatest calculated metric (e.g., one of wireless devices 206 and 208).

In an embodiment, access node 202 may schedule transmissions for any of regions 212 and 214 based on the calculated scheduling metrics for wireless devices 202, 204, 206 and 208. In an embodiment, the calculated scheduling metric for a wireless device may be based on a determined fairness for the region associated with that wireless device, as described herein. Here, the wireless device with the highest calculated scheduling metric may be scheduled the next available transmission (e.g., physical resource block) for any of regions 212 and 214. Wireless transmissions may comprise the transmission of one or more physical resources blocks (PRBs).

Figure 4:
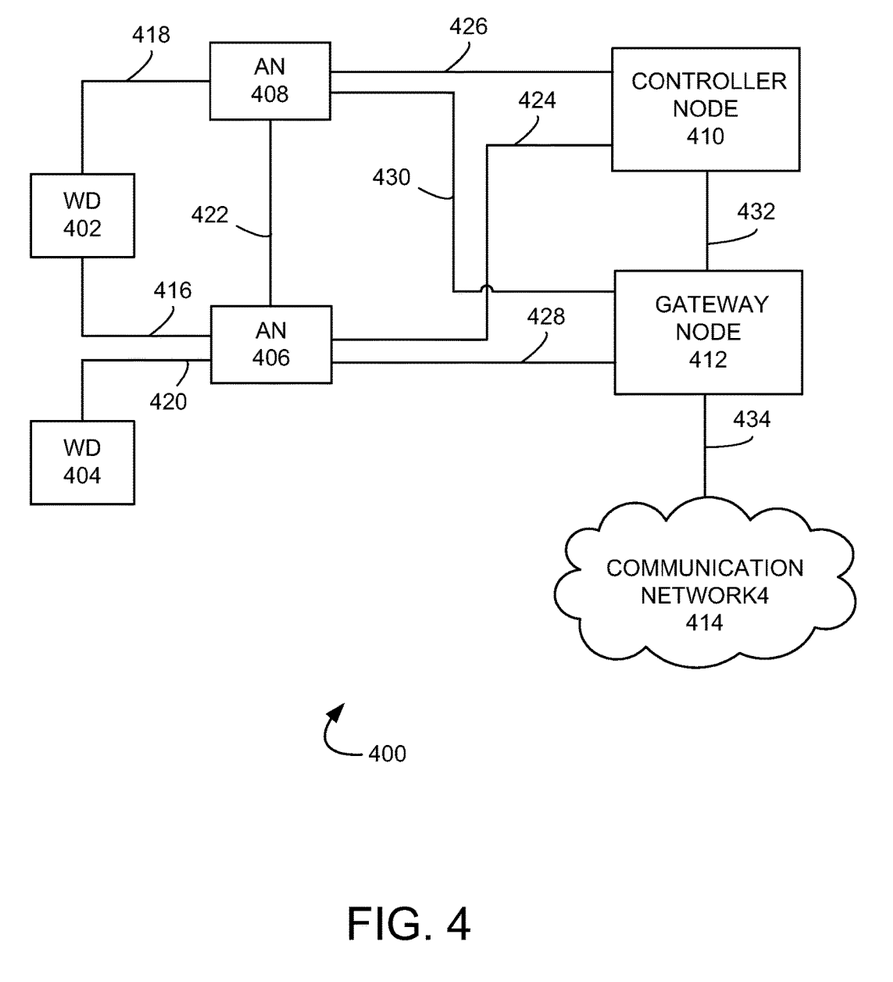
FIG. 4 illustrates another exemplary communication system to configure a scheduler at an access node.

FIG. 4 illustrates another exemplary communication system 400 to configure a scheduler at an access node. Communication system 400 may comprise wireless devices 402 and 404, access node 406 and 408, controller node 410, gateway node 412, communication network 414, and communication links 416, 418, 420, 422, 424, 426, 428, 430, 432, and 434. Other network elements may be present in the communication system 400 to facilitate communication but are omitted for clarity, such as base stations, base station controllers, gateways, mobile switching centers, dispatch application processors, and location registers such as a home location register or visitor location register.

Wireless device 402 and 404 can be any devices configured to communicate over communication system 400 using a wireless communication link. For example, wireless devices 402 and 404 can include a cell phone, a smart phone, a computing platform such as a laptop, palmtop, or a tablet, a personal digital assistant, or an internet access device, and combinations thereof.

Access nodes 406 and 408 are network nodes capable of providing wireless communications to wireless devices 402 and 404, and can be, for example, a base transceiver station, a radio base station, or an eNodeB device. In an embodiment, access node 406 can comprise a serving access node for wireless devices 402 and 404. Access nodes 406 and 408 may communicate with controller node 410 over communication links 424 and 426, respectively, and with gateway node 412 over communication links 428 and 430, respectively. Access nodes 406 and 408 may also communicate directly with each other over communication link 422.

Controller node 410 can be any network node configured to manage services within system 400. Controller node 410 may provide other control and management functions for system 400. The controller node 410 can be a single device having various functions or a plurality of devices having differing functions. For example, controller node 410 can include at least one of a multi-cell/multicast coordination entity (MCE), a mobility management entity (MME), a mobile switching center (MSC), a radio network controller (RNC), and a combination thereof.

Controller node 410 can comprise a processor and associated circuitry to execute or direct the execution of computer-readable instructions to obtain information. Controller node 410 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 410 can receive instructions and other input at a user interface. Controller node 410 can comprise a processor and associated circuitry to execute or direct the execution of computer-readable instructions to obtain information.

Gateway node 412 is a network element which can comprise a processor and associated circuitry to execute or direct the execution of computer-readable instructions. Gateway node 412 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 412 can provide instructions to access nodes 406 and 408 related to channel selection in communications with wireless devices 402 and 404. For example, gateway node 412 can comprise at least one of a serving gateway (SGW), a packet data network gateway (PDNGW), a cellular gateway (CGW), and a combination thereof.

Communication network 414 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 414 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 414 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 416, 418, 420, 422, 424, 426, 428, 430, 432, and 434 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Other wireless protocols can also be used.

Other network elements may be present in the communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access nodes 406 and 408, controller node 410, gateway node 412, and communication network 414 which are omitted for clarity, including additional processing nodes, routers, gateways, and physical and/or wireless data links for carrying data among the various network elements. In an embodiment, any of controller node 410, gateway node 412, and one or more modules of access nodes 406 and/or 408 may perform all or parts of the methods of FIGS. 3 and 6.

Figure 5:
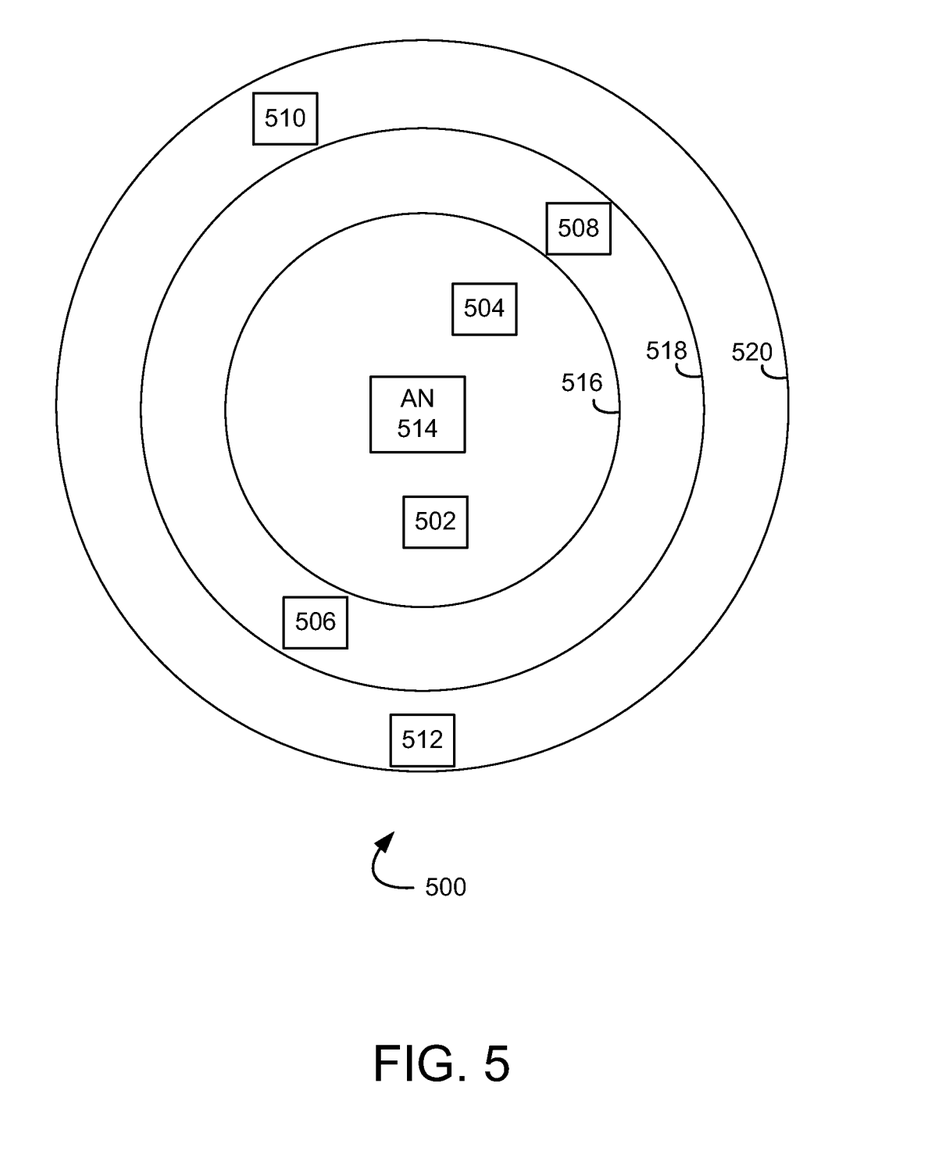
FIG. 5 illustrates another exemplary communication system to configure a scheduler at an access node.

FIG. 5 illustrates an exemplary communication system 500 for configuring a scheduler at an access node. System 500 comprises wireless devices 502, 504, 506, 508, 510, and 512, access node 514, and coverage regions 516, 518, and 520. Wireless devices 502, 504, 506, 508, 510, and 512 may comprise wireless devices similar to wireless device 402 and access node 514 may comprise an access node similar to access node 406.

In an embodiment, system 500 may use a plurality of carriers in order to provide wireless communication services. A plurality of carriers that comprise bandwidth for wireless communications (e.g., 2.5 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers.

In an embodiment, a signal area may comprise an area around an access node where a wireless device may detect wireless signals transmitted from the access node (e.g., a references signal) at a signal level above a threshold. In this example, access node 514 may comprise a signal area that is partitioned into coverage regions 516, 518 and 520. For example, coverage region 516 may comprise the region between access node 514 and a first distance, illustrated by the inner concentric circle, coverage region 518 may comprise the region between region 516 and a second distance, illustrated by the middle concentric circle, and coverage region 520 may comprise the region between region 518 and a third distance, illustrated by the outer concentric circle. Access node 514 may transmit wireless signals over one or more particular band classes (BCs). A band class may comprise a block of wireless spectrum. In an embodiment, a frequency band may comprise a band class. Examples of such band classes may be blocks of spectrum at 800 MHz, 1,900 MHz, and 2,500 MHz In operation, access node 514 may establish communication with wireless devices 502, 504, 506, 508, 510, and 512 such that access node 514 provides the wireless devices access to a communication network (e.g., communication network 414). Access node 514 may schedule transmissions (e.g., physical resource block transmissions) to wireless devices in communication with the access node. For example, a packet may be received at access node 514 that is associated with wireless device 502, and access node 514 may schedule one or more transmissions to wireless device 502 to communicate the data from the received packet.

In an embodiment, access node 514 may schedule transmissions according to a fairness algorithm. For example, for each wireless device in communication with an access node, a scheduler may calculate k such that k=arg max $r_i(t)/R_i(t)$. Here, $R_i(t)$ may comprise an average data rate for wireless device i over a time window, and $r_i(t)$ may comprise an instantaneous data rate (e.g., average instantaneous data rate) for wireless device i. A fairness algorithm may then schedule a transmission for the wireless device that comprises the greatest k value.

In some embodiments, fairness algorithms may limit throughput for an access node. For example, wireless devices 502 and 504 may be closer in proximity to the access node 514, and therefore may comprise a greater channel quality (e.g., CQI) than wireless devices 510 and 512. As such, when communicating with access node 514, wireless devices 502 and 504 may be able to achieve a higher throughput (e.g., use a more efficient modulation and coding scheme) than wireless devices 510 and 512. Accordingly, when scheduling wireless resources (e.g., physical resource block transmissions), fairness to wireless devices 510 and 512 may limit throughput. A system that balances fairness and throughput may be able to provide efficient wireless communications.

Systems and methods are described for configuring a scheduler at an access node. At least two regions may be determined for a coverage area of an access node, wherein a first region is bounded by a first distance from the access node and a second region is bounded by a second distance from the access node such that the second distance is greater than the first distance. Wireless transmissions may be scheduled from the access node based on a fairness algorithm such that the fairness algorithm schedules wireless transmissions to wireless devices associated with the first region based on throughput fairness for the wireless devices associated with the first region and the fairness algorithm schedules wireless transmissions to wireless devices associated with the second region based on throughput fairness for wireless devices associated with the second region.

Figure 6:
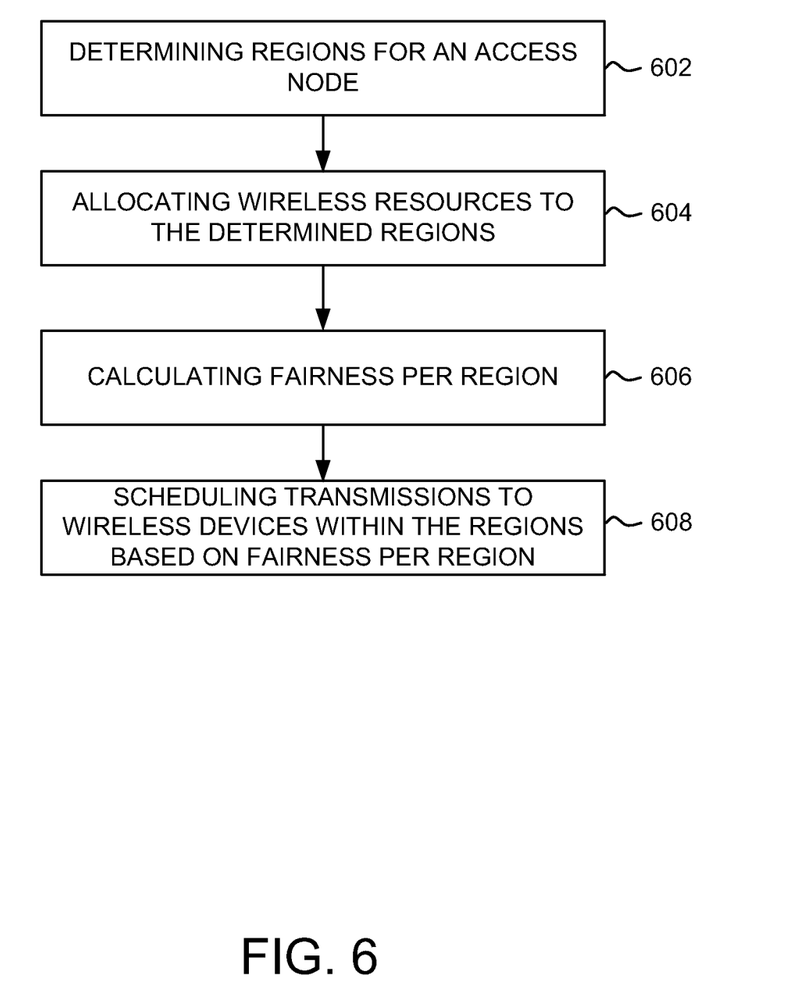
FIG. 6 illustrates another exemplary method for configuring a scheduler at an access node.

FIG. 6 illustrates an exemplary method for configuring a scheduler at an access node. The method will be discussed with reference to the exemplary communication system 500 illustrated in FIG. 5, however, the method can be implemented with any suitable communication system.

Referring to FIG. 6 at step 602, at least two regions may be determined for a coverage area of an access node, wherein a first region is bounded by a first distance from the access node and a second region is bounded by a second distance from the access node such that the second distance is greater than the first distance. For example, coverage regions 516, 518, and 520 may be determined for the coverage area of access node 514. Coverage region 516 may comprise the region between access node 514 and a first distance, illustrated by the inner concentric circle, coverage region 518 may comprise the region between region 516 and a second distance, illustrated by the middle concentric circle, and coverage region 520 may comprise the region between region 518 and a third distance, illustrated by the outer concentric circle.

In an embodiment, the first distance, second distance, and third distance may be based on a percentage of area covered by each coverage region for the coverage area of access node 514. For example, the first distance may be determined such that coverage region 516 covers 50% of the coverage area, the second distance may be determined such that coverage region 518 covers 25% of the coverage area, and the third distance may be determined such that coverage area 520 covers 25% of the coverage area. In this example, coverage area 516 comprises the coverage area that provides wireless devices with the highest channel quality connections with access node 514 (e.g., coverage area associated with highest throughput for wireless devices), coverage area 518 comprises the coverage area that provides wireless devices with the second highest channel quality connections with access node 514 (e.g., coverage area associated with second highest throughput for wireless devices), and coverage area 520 comprises the coverage area that provides wireless devices with the lowest channel quality connections with access node 514 (e.g., coverage area associated with lowest throughput for wireless devices).

In an embodiment, the first distance, second distance, and third distance may be based on a coverage area for band classes used to provide wireless services at access node 514. For example, the first distance may be determined based on a coverage area for a first band class, the second distance may be determined based on a coverage area for a second band class, and the third distance may be determined based on a coverage area for a third band class. In this example, coverage area 516 may provide wireless devices with the highest throughput connections because the first band class may be associated with the highest throughput connections, coverage area 518 may provide wireless devices with the second highest throughput connections because the second band class may be associated with the second highest throughput connections, and coverage area 520 may provide wireless devices with the lowest throughput connections because the third band class may be associated with the lowest throughput connections.

At step 604, resources may be allocated to the coverage regions, wherein a first set of wireless resources at the access node are allocated to the first region, a second set of wireless resources at the access node are allocated to the second region, and a third set of wireless resources are allocated to the third region. For example, wireless resources at access node 514 may be allocated to regions 516, 518 and 520.

In an embodiment, the allocation may be based on a percentage of wireless devices associated with each region. For example, 50% of users may be associated with region 516, 35% with region 518, and 15% with region 520. Accordingly, region 516 may be allocated 50% of the wireless resources (e.g., available physical resource block transmissions) at access node 514, region 518 may be allocated 35% of the wireless resources at access node 514, and region 520 may be allocated 15% of the wireless resources at access node 514.

In another embodiment, the allocation may be based on a historical percentage of wireless devices associated with each region. For example, over a period of time (e.g., hours, days, months, and the like), a historical average may indicate that 50% of users are associated with region 516, 35% with region 518, and 15% with region 520. Accordingly, the allocations to regions 516, 518, and 520, as described herein, may be performed. In an embodiment, the allocation may be based on a historical percentage of wireless devices associated with each region at a particular time. For example, a historical average may indicate that at 9:00 am on a Monday, 50% of users are associated with region 516, 35% with region 518, and 15% with region 520, however at 4:00 pm on a Saturday, 70% of users are associated with region 516, 15% with region 518, and 15% with region 520. Accordingly, the allocations to regions 516, 518, and 520, as described herein, may be performed. In an embodiment, wireless resources at access node 514 may be allocated to the coverage regions in any other suitable manner.

In an embodiment, the same wireless resources may be allocated to all of regions 516, 518, and 520. For example, a set of physical resources blocks may be available for scheduling, and the physical resources blocks may be scheduled to any of regions 516, 518, and 520 (e.g., based on the scheduling metrics calculated for wireless devices associated with the region, as described herein).

At step 606, a scheduling metric may be calculated for each wireless device associated with each region. For example, a fairness metric may be calculated for each wireless devices associated with each of regions 516, 518, and 520.

In an embodiment, a wireless device may be associated with a region based on a channel quality indicator (CQI) for the wireless device. For example, region 516 may be associated with a first set of CQIs, region 518 may be associated with a second set of CQIs, and region 520 may be associated with a third set of CQIs. Accordingly, a wireless device may be associated with a region based on the CQI reported for the wireless device.

In an embodiment, a wireless device may be associated with a region based on a modulation and coding scheme for the wireless device. For example, region 516 may be associated with a first set of modulation and coding schemes, region 518 may be associated with a second set of modulation and coding schemes, and region 520 may be associated with a third set of modulation and coding schemes. Accordingly, a wireless device may be associated with a region based on the modulation and coding scheme the wireless device uses to communicate with access node 514.

In an embodiment, a wireless device may be associated with a region based on a location for the wireless device. For example, region 516 may be associated with a first geographic region (e.g., from the location of access node 414 to the first distance), region 518 may be associated with a second geographic region (e.g., from the first distance to the second distance), and region 520 may be associated with a third geographic region (e.g., from the second distance to the third distance). Accordingly, a wireless device may be associated with a region based on which geographic region in which the wireless device is located.

In an embodiment, a scheduling metric may be calculated for wireless devices 502, 504, 506, 508, 510, and 512. For example, the scheduling metric may be based on an average data rate and an instantaneous data rate for the wireless device. In an embodiment, the scheduling metric may comprise: $k_i = \arg\max r_i(t)/R_i(t)$. Here, $R_i(t)$ may comprise an average data rate (or throughput) for wireless device i over a time window, and $r_i(t)$ may comprise an instantaneous data rate or throughput (e.g., average instantaneous data rate or throughput) for wireless device i.

In another embodiment, the scheduling metric may be based on a channel quality indicator (CQI), average data rate (or throughput), and fairness calculated for the wireless device. For example, the scheduling metric may comprise:

$$k_i = \frac{CQI_i}{R_i^{(1/Fairness_i)}}$$

Here, $CQI_i$ may comprise the channel quality indicator for wireless device i, $R_i$ may comprise an average data rate (or throughput) for wireless device i over a time window, and Fairness$_i$ may comprise a calculated fairness for wireless device i, where the calculated fairness comprises the fairness for the wireless device based on (e.g., relative to) the coverage region associated with the wireless device. The fairness metric may comprise a value between 0 and 1 that indicates the fairness for the coverage region associated with the wireless device.

In an embodiment, the fairness metric may comprise:

$$\text{Fairness} = \frac{\left(\sum_{i=1}^{n} x_i\right)^2}{n \cdot \sum_{i=1}^{n} x_i^2}$$

Here, $x_i$ may comprise a data rate (or throughput) for wireless device i, where the Fairness is calculated based on summations over wireless devices i to n, as represented above. In this example, a fairness metric may be calculated for a coverage region based on the wireless devices associated with the particular coverage region. In an embodiment, coverage region 516 may comprise a first wireless device, a second wireless device, and a third wireless device. Here, the fairness metric may be calculated for region 516, where n=3, and where the data rate (or throughput) for each of the three wireless devices is used to determine the metric, as illustrated above.

In an embodiment, $k_i$ (scheduling metric) may be calculated for wireless device 502 based on a CQI for wireless device 502 ($CQI_i$), an average throughput for wireless device 502 ($R_i$), and a calculated fairness metric for the coverage region associated with wireless device 502 ($Fairness_i$), that is coverage region 516. In this example, the calculated fairness metric for coverage region 516 may be determined based on the data rates (or throughputs) for the wireless devices associated with region 516 ($x_i$). A $k_i$ may similarly be calculated for each of wireless devices 504, 506, 508, 510, and 512 based on Fairness metrics for regions 516, 518, and 520.

At step 608, wireless transmissions may be scheduled from the access node based on a fairness algorithm such that the fairness algorithm schedules wireless transmissions to wireless devices associated with the first region based on throughput fairness for the wireless devices associated with the first region, the fairness algorithm schedules wireless transmissions to wireless devices associated with the second region based on throughput fairness for wireless devices associated with the second region, and the fairness algorithm schedules wireless transmissions to wireless devices associated with the third region based on throughput fairness for wireless devices associated with the third region. For example, wireless transmissions may be scheduled from access node 514 to wireless devices 502, 504, 506, 508, 510, and 512. The wireless transmission may be scheduled based on a coverage region associated with the wireless devices. In an embodiment, wireless devices 502 and 504 may be associated with region 516, wireless devices 506 and 508 may be associated with region 518, and wireless devices 510 and 512 may be associated with region 520.

In an embodiment, a scheduling metric may be calculated for each of wireless devices 502, 504, 506, 508, 510, and 512, as described herein. Access node 514 may schedule transmissions for region 516 based on the calculated scheduling metrics for wireless devices 502 and 504, may schedule transmissions for region 518 based on the calculated scheduling metrics for wireless devices 506 and 508, and may schedule transmissions for region 520 based on the calculated scheduling metrics for wireless devices 510 and 512. For example, wireless resources may be allocated to each or regions 516, 518, and 520, and transmissions may be scheduled based on the allocations. In an embodiment, access node 514 may schedule a transmission for region 516 to the wireless device associated with that region that comprises the greatest calculated scheduling metric (e.g., one of wireless devices 502 and 504), may schedule a transmission for region 518 to the wireless device associated with that region that comprises the greatest calculated scheduling metric (e.g., one of wireless devices 506 and 508), and may schedule a transmission for region 520 to the wireless device associated with that region that comprises the greatest calculated scheduling metric (e.g., one of wireless devices 510 and 512).

In an embodiment, wireless transmission may be scheduled for a coverage region based on the allocated wireless resources for that region. For example, access node 514 may schedule a transmission for region 516 from a first set of wireless resources associated with the region, may schedule a transmission for region 518 from a second set of wireless resources associated with the region, and may schedule a transmission for region 520 from a third set of wireless resources associated with the region.

In an embodiment, access node 514 may schedule transmissions for any of regions 516, 518, and 520 based on the calculated scheduling metrics for wireless devices 502, 504, 506, 508, 510, and 512. For example, access node 514 may use a set of resources for all of regions 516, 518, and 520. In an embodiment, the calculated scheduling metric for a wireless device may be based on a determined fairness for the region associated with that wireless device, as described herein. Here, the wireless device with the highest calculated scheduling metric may be scheduled the next available transmission (e.g., physical resource block) for any of regions 516, 518, and 520.

In an embodiment, regions 516, 518, and 520 may be associated with a first band class, a second band class, and a third band class respectively. In this example, a fairness metric (as described herein) may be calculated relative to each band class, and a scheduling metric for each wireless device (as described herein) may be calculated relative to the band class associated with the wireless device. In an embodiment, where a calculated fairness metric for a particular band class falls below a criteria (e.g., threshold fairness), one or more wireless devices communicating over that particular band class may be instructed to switch to another band class. Subsequently, a new fairness metric may be calculated for each of the band classes after handover. Transmissions may then be scheduled from the access node to wireless devices according to the new fairness metrics (and subsequently calculated scheduling metrics for the wireless devices).

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 7:
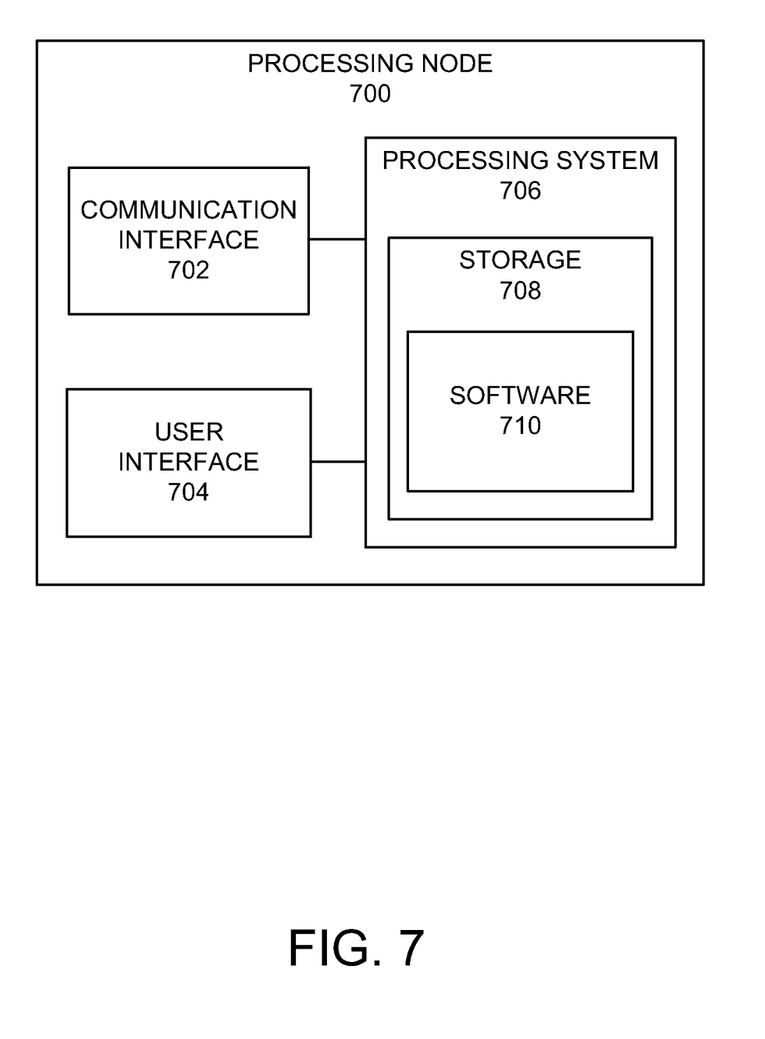
FIG. 7 illustrates an exemplary processing node.

FIG. 7 illustrates an exemplary processing node 700 in a communication system. Processing node 700 comprises communication interface 702, user interface 704, and processing system 706 in communication with communication interface 702 and user interface 704. Processing node 700 can be configured to determine a communication access node for a wireless device. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

Examples of processing node 700 include controller node 410 and gateway node 412. Processing node 700 can also be an adjunct or component of a network element, such as an element of access nodes 104 or 406 and the like. Processing node 700 can also be another network element in a communication system. Further, the functionality of processing node 700 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for configuring a scheduler at an access node, the method comprising:
    determining at least two regions for a coverage area of the access node, wherein
        a first region is bounded by a first distance from the access node and a second region is bounded by a second distance from the access node such that the second distance is greater than the first distance, and
        the second region is bounded by the first distance such that the second region does not intersect with the first region;
    calculating scheduling metrics for wireless devices in communication with the access node, the scheduling metrics being based on a channel quality indicator for each of the wireless devices, an average data rate for each of the wireless devices, and a determined fairness for a coverage region associated with each of the wireless devices, wherein the determined fairness for a particular coverage region is based on data rates for the wireless devices associated with the particular coverage region and a number of the wireless devices associated with the particular coverage region;
    scheduling wireless transmissions to wireless devices based on the calculated scheduling metrics such that a wireless transmission is scheduled for a wireless device with a largest scheduling metric from amongst the wireless devices in communication with the access node.

2. The method of claim 1, wherein the coverage area comprises a sector of the access node and the first region and second region comprise regions within the sector.

3. The method of claim 1, wherein
    the first distance comprises a coverage area for a first band class used by the access node to communicate with wireless devices and the second distance comprises a coverage area for a second band class used by the access node to communicate with wireless devices.

4. The method of claim 1, further comprising:
    allocating a first set of wireless resources at the access node to the first region and a second set of wireless resources at the access node to the second region.

5. The method of claim 4, wherein wireless resources are scheduled from the first set of wireless resources for wireless devices associated with the first region based on the calculated scheduling metrics and wireless resources are scheduled from the second set of wireless resources for wireless devices associated with the second region based on the calculated scheduling metrics.

6. The method of claim 1, further comprising:
    determining a third region for the coverage area of the access node, wherein the third region is bounded by a third distance from the access node such that the third distance is greater than the second distance; and
    calculating the scheduling metrics for wireless devices in communication with the access node that are associated with the third region; and
    scheduling wireless transmissions to wireless devices based on the calculated scheduling metrics such that a wireless transmission is scheduled is scheduled for a wireless device with the largest scheduling metric from amongst the wireless devices in communication with the access node.

7. The method of claim 6, further comprising:
    allocating a first set of wireless resources at the access node to the first region, a second set of wireless resources at the access node to the second region, and a third set of wireless resources at the access node to the third region,
    wherein wireless resources are scheduled from the first set of wireless resources for wireless devices associated with the first region based on the calculated scheduling metrics, wireless resources are scheduled from the second set of wireless resources for wireless devices associated with the second region based on the calculated scheduling metrics, and wireless resources are scheduled from the third set of wireless resources for wireless devices associated with the third region based on the calculated scheduling metrics.

8. The method of claim 1, wherein an average data rate for wireless devices associated with the first region is greater than an average data rate for wireless devices associated with the second region.

9. The method of claim 1, wherein the first region is associated with a first set of channel quality indicators such that wireless devices that comprise a channel quality indicator within the first set are associated with the first region and the second region is associated with a second set of channel quality indicators such that wireless devices that comprise a channel quality indicator within the second set are associated with the second region.

10. A system for configuring a scheduler at an access node, the system comprising:
a processing node with a processor configured to:
determine at least two regions for a coverage area of the access node, wherein a first region is bounded by a first distance from the access node and a second region is bounded by a second distance from the access node such that the second distance is greater than the first distance, and the second region is bounded by the first distance such that the second region does not intersect with the first region;
allocate a first set of wireless resources at the access node to the first region and a second set of wireless resources at the access node to the second region;
calculate a scheduling metric for each wireless device in communication with the access node, the scheduling metric for a particular wireless device comprising a ratio of instantaneous data rate for the particular wireless device to average data rate for the particular wireless device; and
schedule wireless transmissions to wireless devices based on the calculated scheduling metrics and a fairness algorithm, wherein the fairness algorithm schedules wireless resources from the first set of wireless resources for wireless devices associated with the first region based on the calculated scheduling metrics throughput for the wireless devices associated with the first region and the fairness algorithm schedules wireless resources from the second set of wireless resources for wireless devices associated with the second region based on the calculated scheduling metrics throughput for the wireless devices associated with the second region.

11. The system of claim 10, wherein the coverage area comprises a sector of the access node and the first region and second region comprise regions within the sector.

12. The system of claim 10, wherein
the first distance comprises a coverage area for a first band class used by the access node to communicate with wireless devices and the second distance comprises a coverage area for a second band class used by the access node to communicate with wireless devices.

13. The system of claim 10, wherein the processing node is further configured to:
determine a third region for the coverage area of the access node, wherein the third region is bounded by a third distance from the access node such that the third distance is greater than the second distance; and
calculate the scheduling metrics for wireless devices in communication with the access node that are associated with the third region; and
schedule wireless transmissions to wireless devices based on the calculated scheduling metrics and the fairness algorithm such that the fairness algorithm schedules wireless transmissions for wireless devices associated with the first region based on the calculated scheduling metrics for the wireless devices associated with the first region, the fairness algorithm schedules wireless transmissions for wireless devices associated with the second region based on the calculated scheduling metrics for wireless devices associated with the second region, and the fairness algorithm schedules wireless transmissions for wireless devices associated with the third region based on the calculated scheduling metrics for wireless devices associated with the third region.

14. The system of claim 10, wherein the first region is associated with a first set of channel quality indicators such that wireless devices that comprise a channel quality indicator within the first set are associated with the first region and the second region is associated with a second set of channel quality indicators such that wireless devices that comprise a channel quality indicator within the second set are associated with the second region.

\* \* \* \* \*